United States Patent
Fukunaga et al.

(10) Patent No.: US 7,406,570 B2
(45) Date of Patent: Jul. 29, 2008

(54) MULTISYSTEM NETWORK, AND DEVICE AND METHOD FOR ACCESS TO DATA STORAGE

(75) Inventors: Yoichiro Fukunaga, Tokyo (JP); Tsutomu Inui, Chiba (JP); Akira Sonoda, Chiba (JP); Hideyoshi Asai, Kanagawa (JP); Hidehiro Inooka, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 680 days.

(21) Appl. No.: 10/952,389

(22) Filed: Sep. 28, 2004

(65) Prior Publication Data

US 2005/0105536 A1   May 19, 2005

(30) Foreign Application Priority Data

Sep. 30, 2003 (JP) .............................. 2003-339211

(51) Int. Cl.
*G06F 12/00* (2006.01)

(52) U.S. Cl. ..................................... 711/147

(58) Field of Classification Search .................. 711/147
See application file for complete search history.

(56) References Cited

U.S. PATENT DOCUMENTS

| 4,152,764 A | * | 5/1979 | Connors et al. | ............. 711/151 |
| 5,548,340 A | * | 8/1996 | Bertram | ....................... 348/559 |
| 5,579,512 A | * | 11/1996 | Goodrum et al. | .............. 703/23 |

* cited by examiner

*Primary Examiner*—Matt Kim
*Assistant Examiner*—Ryan Dare
(74) *Attorney, Agent, or Firm*—Frommer Lawrence & Haug LLP; William S. Frommer; Ellen Marcie Emas

(57) ABSTRACT

There are provided a multisystem network, and a device and method for access to a data storage unit in order to allow processors in a plurality of devices to access the data storage unit. The data storage unit has a data storage area divided in a first area for a first device and a second area for a second device. The first and second devices are connected to the data storage unit via a connection circuit. A first processor in the first device can access directly the data storage unit. The connection circuit has provided therein an emulation register corresponding to a register which stores a command or control data used for the first processor in the first device to access the data storage unit. A second processor in the second device accesses the data storage unit via the emulation register and with intervention of the first processor.

26 Claims, 6 Drawing Sheets

MULTISYSTEM NETWORK, AND DEVICE AND METHOD FOR ACCESS TO DATA STORAGE

BACKGROUND OF THE INVENTION

1. Field of the Invention

The present invention relates to a user interface technique in a multisystem network in which a data storage unit such as a hard disk drive can be accessed in common by a plurality of devices, and to a device for access to the data storage unit. The present invention also relates to a method for access to a data storage unit, suitably applicable in the multisystem network.

This application claims the priority of the Japanese Patent Application No. 2003-339211 filed on Sep. 30, 2003, the entirety of which is incorporated by reference herein.

2. Description of the Related Art

Having various advantages such as a large storage capacity, random access, capability of reproducing data having just been recorded a predetermined time before the reproduction, etc., the hard disk drive has recently come to be used as a data storage means in more and more recorder/players for TV broadcast programs (cf. Japanese Patent Application Laid-Open No. 2002-094916).

The Advanced Technology Attachment (ATA) is applied as an interface standard to the file management in the hard disk drive.

Note here that a multisystem network has been proposed which is a combination of a TV broadcast program recorder/player and a video game machine. If a hard disk drive can be shared by the video game machine and recorder/player, the multisystem network can be simplified in construction and thus produced with less costs.

For building up a multisystem network in which a hard disk drive as a data storage unit is accessed by both a processor in the video game machine and processor in the recorder/player, it is necessary to provide a multisystem-network hardware construction capable of arbitration in such access between the processors.

Since the large number of existent video game machines are desirably reusable in such a multisystem network, so it is essential that the video game machine hardware should be designed to have a construction as similar to the conventional one as possible and the file system for the video game machine should be reusable as it is or with a modification as small as possible.

OBJECT AND SUMMARY OF THE INVENTION

It is therefore an object of the present invention to overcome the above-mentioned drawbacks of the related art by providing a multisystem network including a plurality of devices each with a processor and in which a single data storage unit is shared by the plurality of devices and the data storage unit can be accessed by a processor in each of the plurality of devices with satisfaction of the above-mentioned requirements.

The above object can be attained by providing a multisystem network including:

a first device with a first processor;

a second device with a second processor;

a data storage unit having a first data storage area for the first device and a second data storage area for the second device; and a connection circuit connected between the first and second devices and the data storage unit, the connection circuit having provided therein an emulation register equivalent to a register for storage of a command or control data used for access by the first processor to the data storage unit;

data transfer between the first device and data storage unit being made by the first processor accessing directly the data storage unit via the connection circuit; and data transfer between the second device and data storage unit being made by the second processor accessing the emulation register and by the first processor accessing the data storage unit correspondingly to the content of the emulation register.

In the above multisystem network, the data storage area of the data storage unit is divided into the first area for the first device and second area for the second device.

In the above multisystem network, the data transfer between the first device and data storage unit is made through direct access by the first processor to the data storage unit. On the other hand, the data transfer between the second device and data storage unit is made through access by the second processor to the emulation register and access, corresponding to the content of the emulation register, by the first processor to the data storage unit.

That is, in the above multisystem network, the first processor is not only involved in data transfer between the first device and data storage unit but also in data transfer between the second device and data storage unit to arbitrate in data transfer between the data storage unit and first and second devices.

In the above multisystem network, because of the coordination between the emulation register and first processor, the second processor operates as if it directly accessed the data storage unit.

In the above multisystem network, while data is being transferred between the first device and data storage unit, the first processor sends status information indicating that the data storage unit is busy to the second processor in the second device via the emulation register to inhibit the second processor from accessing the data storage unit.

In the above multisystem network, the first processor arbitrates in data transfer between the second device and data storage unit to give priority to data transfer between the first device and data storage unit.

In the above multisystem network, the first processor recognizes a command or control data the second processor of the second device has written to the emulation register, and will not make any control over data access, based on the recognized command or control data, to the data storage unit when the recognized command or control data is a predetermined one.

If the data storage unit happens to be accessible in the course of a preferential data transfer being made between the first device and data storage unit, there is received a command for access, based on a command or control data from the second processor, to the data storage unit, and an operation corresponding to the command is performed, the data transfer between the first device and data storage unit will possibly be unsuccessful.

More specifically, if the data storage unit happens to be accessible in the course of data transfer being made between the first device and data storage unit at a predetermined rate, there is received a command for changing the data transfer rate for data transfer between the second device and data storage unit and the data transfer rate is changed, subsequent transfer of data between the first device and data storage unit will possibly be unsuccessful.

With the above taken in account, the multisystem network is arranged such that the first processor recognizes a command or control data the second processor of the second device has written to the emulation register, and will not make any control over data access, based on the recognized command or control data, to the data storage unit when the recognized command or control data is a predetermined one which will cause the above trouble.

Also, in the multisystem network, when the first processor does not make any control over access, based on the command or control data, to the data storage unit, it sends, to the second processor via the emulation register, status information apparently indicating that it has made a control over data access, based on the command or control data to the data storage unit.

In the multisystem network, when the first processor does not make any control, based on the command or control data issued by the second processor, over access to the data storage unit, it sends, to the second processor via the emulation register, status information apparently indicating that it has made a control, based on the command or control data over data access to the data storage unit. Therefore, the second processor will be able to move to a next step taking that the control based the command or control data issued by the second processor has been done.

In the multisystem network, the second processor converts a command or control data issued by itself into a one complying to an interface standard applied to the data storage unit, and writes it into the emulation register.

In the multisystem network, even if the interface of a file system handled in the second processor is different from that of the data storage unit, the command or control data from the second processor is converted into a one complying to the interface standard in the data storage unit and written to the emulation register.

Therefore, even if the second device is the aforementioned video game machine, the data storage can be accessed without modification of the hardware and file system of the video game machine.

In the multisystem network, in for the second processor to make data access to the first area, the connection circuit has a shared register and shared buffer provided therein to store a command or control data for use to access the data storage unit and which can be accessed in common by the first and second processors.

The multisystem network is provided for the second process to access the first area of the data storage unit as the first device. That is, in the invention, there are provided a shared register and shared buffer accessible in common by the first and second processors. When accessing the first area, the second processor uses the shared register and shared buffer. The first processor transfers data between the first area of the data storage unit and the shared buffer according to a command written to the shared register.

In the multisystem network, data to be read from or written to the data storage unit is managed by a file system managed by the first processor, and when data is read from or written to the first area by the second processor, the data is read from or written to the shared buffer as data for the file system managed by the first processor.

As in the invention, when accessing the first area of the data storage unit, the file system of the data has to be the file system managed by the first processor. In the invention, when the second processor reads data from or writes data to the first area of the data storage unit, the data is converted into data compatible with the file system managed by the first processor. Therefore, the second processor can access the data in the first area without any trouble.

In the multisystem network according to the present invention, a single data storage unit can conveniently be accessed in common by a plurality of devices each having a processor.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning embodiments of the multisystem network, and the device and method for access to the data storage unit with reference to the accompanying drawings.

In the embodiments which will be illustrated and described below, the present invention is applied to a multimedia recording/playback system whose information processing unit includes a video game machine and information playback unit includes a TV broadcast recorder.

Note that in the following description, the "content" means information the human can recognize visually and aurally, such as audio data such as music, images such as moving and still pictures, text data such as electronic novels, game programs or the like.

Also, the "medium" means an information storage medium such as a hard disk, optical disk, memory card, magnetic tape or the like, and an information transmission medium such as wave, cable or the like. However, a storage medium such as a game program medium or a transmission medium, of which the data format and compression format are different from the "medium" is differentiated from the "medium".

<Construction of Multimedia Recording/Playback System>

Figure 1:
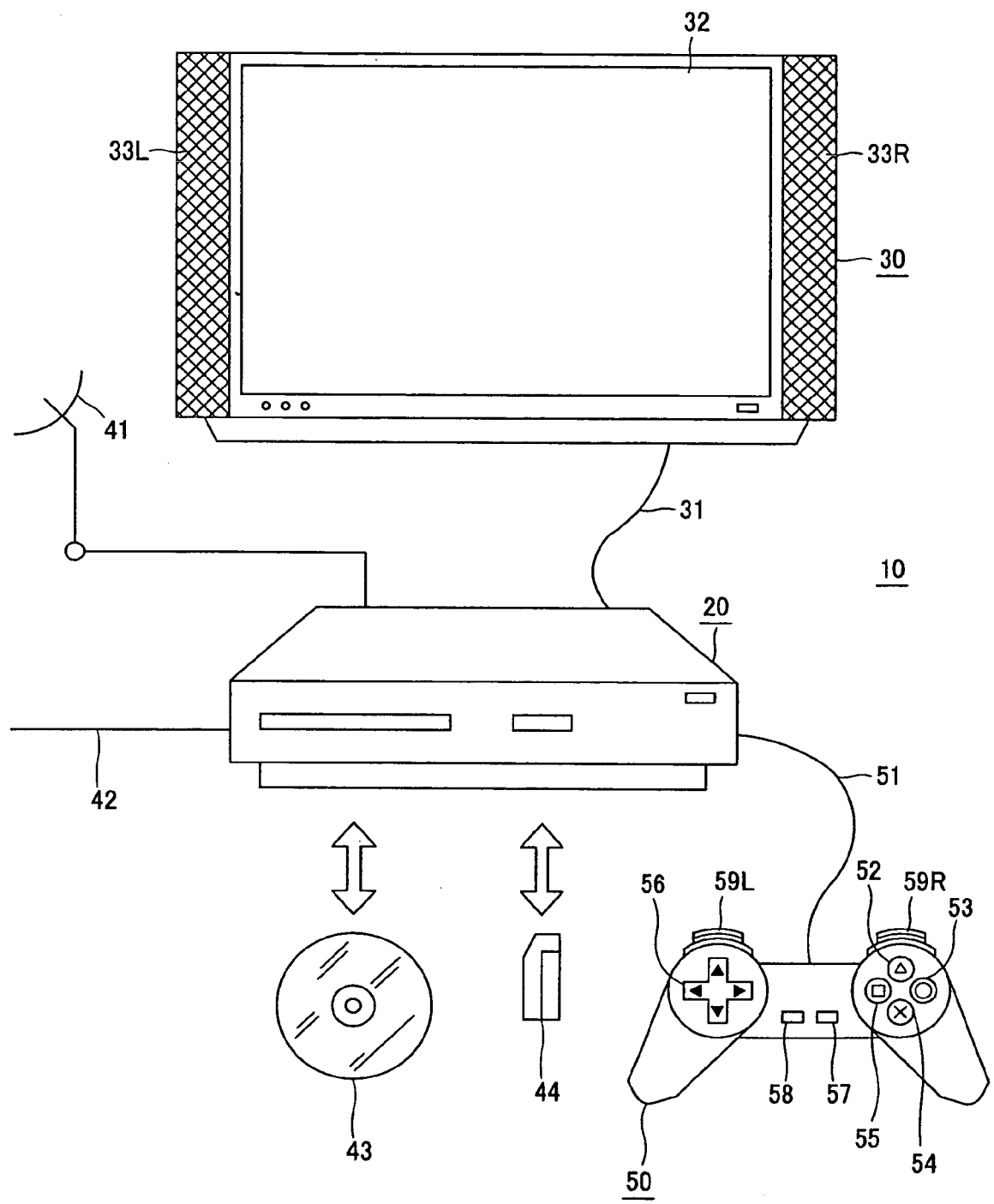
FIG. 1 schematically illustrates a constructional example of the multimedia recording/playback system including the present invention.

Referring now to FIG. 1, there is schematically illustrated the basic construction of a multimedia recording/playback system. As shown, the multimedia recording/playback system, generally indicated with a reference 10, includes a multimedia recorder/player 20 to which the present invention is applied.

In this embodiment, the multimedia recorder/player 20 does not includes any display on which an image and graphic user interface screen are displayed but includes a video output terminal (not shown) instead. The video output terminal is connected to a monitor display 30 which is a CRT (cathode-ray tube) or LCD (liquid crystal display), for example, by a video output terminal connecting cable 31 of the multimedia recorder/player 20, and the monitor display 30 has a screen 32 which displays an image and user interface screen.

Note that in the embodiment in FIG. 1, the monitor display 30 has speakers 33L and 33R provided at the opposite ends thereof and which are supplied with an audio signal from an audio output terminal (not shown) of the multimedia recorder/player 20 via a cable (not shown) and reproduce the audio signal acoustically.

The multimedia recorder/player 20 is supplied with content information via various types of media such as broadcasting, Internet, optical disk such as DVD (digital versatile disk), CD (compact disk) or the like, memory card, etc.

The broadcasting medium will be described below. In this embodiment, a TV broadcast reception antenna 41 is connected to the multimedia recorder/player 20 which will thus be supplied with a TV broadcast signal received by the reception antenna 41. Then, in the multimedia recorder/player 20, a broadcast program content selected by the user is extracted from the TV broadcast signal, decoded, and a broadcast program image thus formed is displayed on the screen of the monitor display 30 while a sound of the broadcast program is acoustically reproduced by the speakers 33L and 33R of the monitor display 30. Also, the multimedia recorder/player 20 has also a function to record the broadcast program content.

Next, the Internet medium will be described. The multimedia recorder/player 20 has connected thereto a communication (telephone) line 42 which connects the multimedia recorder/player 20 to the Internet, and web content data acquired via the Internet is supplied to the multimedia recorder/player 20. The web content data can be stored in the multimedia recorder/player 20 and also utilized with various functions such as a game program function provided in the multimedia recorder/player 20.

Further, the optical disk medium will be described. The multimedia recorder/player 20 has a function to read data in a content stored in an optical disk 43 such as DVD, CD or the like, decodes the data thus read and supplies the data to the monitor display 30 on which the data is displayed as an image and from which it is provided as a sound. Also, the multimedia recorder/player 20 has also a function to store moving picture data and audio data in the video content read from a DVD, and music content data read from a CD.

An optical disk can store contents including, for example, images, music and sound in a movie, music sounds such as classical music, popular songs and the like, electronic novel, etc. Data in an electronic novel as a content include text data, audio data for recitation, image data such as book illustrations, etc.

The memory card will be described. The multimedia recorder/player 20 has a function to read, and a function to write, data stored in a memory card 44. The memory card 44 can store content data including a captured image such as a moving picture or still picture captured by a digital camera, sound information incidental to the captured image, etc. These data can be stored in a data storage unit provided in the multimedia recorder/player 20.

In this embodiment, the multimedia recorder/player 20 has a video game function. The multimedia recorder/player 20 has connected thereto by an interconnecting cable 51 a command input unit (will be referred to as "remote commander" hereunder) 50 as a video game controller. According to this embodiment, since the remote commander 50 is intended primarily for use as the video game controller, so it has a relatively small number of control buttons. In the embodiment shown in FIG. 1, the remote commander 50 has four control buttons 52, 53, 54 and 55 provided at the respective apexes of an imaginary rhombus, cross-shaped button 56 having directional arrows, start button 57, select button 58, and an L-button 59L and R-button 59R provided at the lateral side of the remote commander 50.

<Construction of Multimedia Recorder/Player 20>

Figure 2:
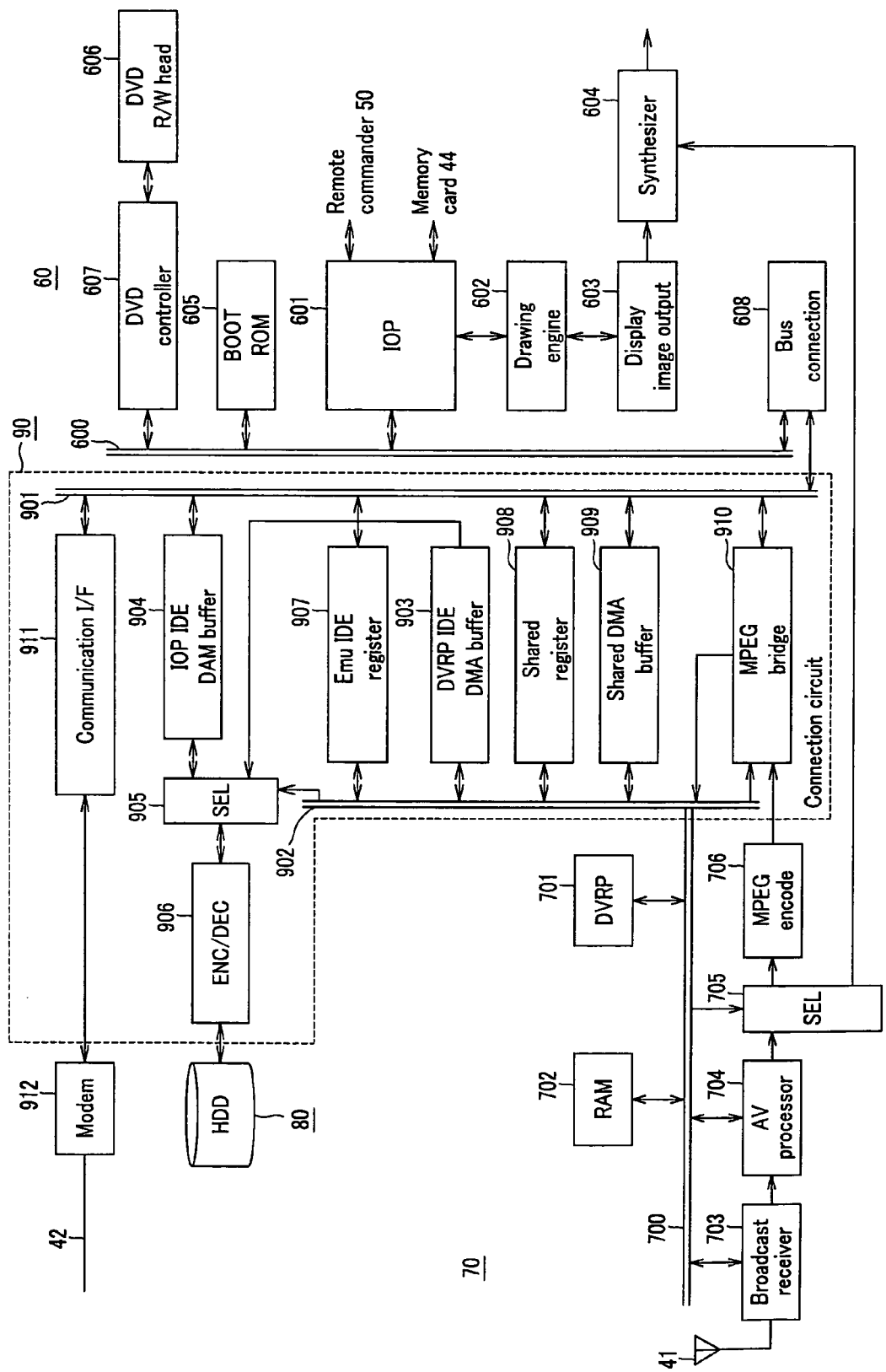
FIG. 2 is a schematic block diagram of the multimedia recording/playback system including the present invention.

FIG. 2 shows the hardware construction of a substantial part of the multimedia recorder/player 20 as an example of the multisystem network according to this embodiment. It should be noted that in the example shown in FIG. 2, the audio signal system is omitted for the simplicity of the illustration and explanation.

As shown, the multimedia recorder/player 20 according to this embodiment includes a video game machine 60 as an example of the information processor, a TV broadcast recorder 70 as an example of the information recorder, a hard disk drive 80 as an example of the data storage unit, and an connection unit 90 for connection of the video game machine 60, TV broadcast recorder 70 and hard disk drive 80 to each other.

[Game Machine 60]

In the multimedia recorder/player 20 according to this embodiment, the video game machine 60 is designed to have a generally similar hardware construction to that of the conventional video game machines with a priority given to the reusability of the existent video game machines. Also, an input/output interface between the DVD driver and memory card 44, remote commander 50 and a remote-control signal receiver are provided in the video game machine 60. It should be noted that the remote-control signal receiver is not shown in FIG. 2.

In the video game machine 60, there is provided a bus 600 having connected thereto a processor (will be referred to as "IOP" hereunder) 601 forming a microcomputer, a boot ROM (read-only memory) 605, and a DVD controller 607.

As shown, the DVD controller 607 has a DVD read/write head 606 connected thereto. To this multimedia recorder/player 20 according to this embodiment, there is provided a game program as a DVD having the game program recorded therein. The boot ROM 605 has written therein a program used to start up the game program. Also according to this embodiment, a DVD having a content such as a movie recorded therein can also be reproduced, and a TV broadcast program can be recorded to a recordable DVD.

A drawing engine 602 is connected to the IOP 601, and also an interface between the remote commander 50 and memory card 44 is also connected to the IOP 601.

The drawing engine 602 is used to generate drawing data such as a drawing command on the basis of the game program, drawing data for generating graphic-user interface screen data corresponding to a command entered by the user by operating the remote commander 50, etc. The drawing engine 602 has also a function to decode image data recorded in a DVD and having been compressed by coding according to the MPEG (Moving Picture Experts Group). The drawing engine 602 is also a CPU to run an application.

The drawing date generated by the drawing engine 602 on the basis of the game program is supplied to a display image output unit 603. The display image output unit 603 generates display image data for display on the monitor display 30 on the basis of the drawing data or the like. The display image output unit 603 sends the display image data to the monitor display 30 via an image synthesizer 604.

Also, in case the DVD has no game program recorded therein, but has a movie content or the like recorded therein, the drawing engine 602 decodes the movie content having been compressed by coding under the control of the IOP 601, the decoded data is formed by the display image output unit 603 into image data to be reproduced, and the data to be reproduced is supplied to the monitor display 30 via the image synthesizer 604.

Also, the drawing data intended for the drawing engine 602 to generate a graphic-user interface screen in response to a control command from the IOP 601 is sent to the display image output unit 603 which will generate image data on the graphic-user interface screen. The image data on the graphic-user interface screen is sent to the image synthesizer 604 where it will be combined with TV broadcast program image data from the TV broadcast recorder 70 to have the latter data superposed thereon and a graphic-user interface screen be displayed on the monitor display 30, as will be described in detail later.

The IOP 601 has also a function to judge the command entered by the user operating the remote commander 50 via the graphic-user interface, and transfer it to the TV broadcast recorder 70 via the connection circuit 90 when an operation corresponding to the user's command relates to the TV broadcast recorder 70.

The IOP 601 has additionally a function to record the TV broadcast program content to a DVD as will be described in detail later.

The IOP 601 further has a function to make data read or write access to the hard disk drive 80 via the connection circuit 90 and with intervention of a processor 701 of the TV broadcast recorder 70. This operation will be described in detail later.

There is provided a bus connection unit 608 which connects a bus 901 of the connection circuit 90, which will further be described later, and the bus 600 of the video game machine 60 to each other. The bus connection unit 608 provides a so-called fire wall to prevent illegal access by the connection circuit 90 to the video game machine 60.

[TV Broadcast Recorder 70]

As shown, the TV broadcast recorder 70 has provided therein a bus 700 to which there are connected the processor (will be referred to as "DVRP" hereunder) 701 forming a microcomputer and a work RAM 702.

The TV broadcast recorder 70 has provided therein a TV broadcast receiver 703 which selects, from TV signals received at the reception antenna 41, a broadcast program corresponding to a user's channel selection entered via an infrared remote commander (not shown), and sends it to an AV (audio visual) processor 704. It should be noted that an infrared remote-control signal is received by the video game machine 60, transferred to the bus 700 via the connection circuit 90 (shared register 908) and processed by the DVRP 701 for control of the channel selection and AV signal.

The AV processor 704 reproduces video and audio signals of a TV broadcast program content. The reproduced video and audio signals are supplied to a selection circuit 705. Then, for recording the TV broadcast program content, the selection circuit 705 is controlled by the DVRP 701 to supply the program content to an MPEG encoder 706.

The video and audio signals are compressed by coding by the MPEG encoder 706, and the compressed video and audio signals are recorded to the hard disk drive 80 via the connection circuit 90 under the control of the DVRP 701 or to a DVD under the control of the IOP 601.

Also, to simply view or listen to the TV broadcast program content without recording it, image data from the selection circuit 705 is supplied to the monitor display 30 via the image synthesizer 604.

[Connection Circuit 90]

Next, the connection circuit 90 will be illustrated and explained in detail. The connection circuit 90 is provided to transfer a command entered by the user and accepted by the video game machine 60 from the latter to the TV broadcast recorder 70 so that both the IOP 601 of the video game machine 60 and the DVRP 701 of the TV broadcast recorder 70 can access the hard disk drive 80.

Note that according to this embodiment, the TV broadcast recorder 70 can have a preferential access to the hard disk drive 80 as having been described above. That is, priority is given to recording and reproduction of a TV broadcast program content.

Also, the data storage area of the hard disk drive 80 is divided into subdivisional areas such as a data recording area DV for video and audio data of a TV broadcast program content or the like from the TV broadcast recorder 70, and a data recording area IO for the video game machine 60.

According to this embodiment, access by the IOP 601 to the hard disk drive 80 is basically intended for reading data from, or writing data to, the data recording area IO. Also, for recording or reproducing video and audio data of a TV broadcast program or the like, the DVRP 701 will access the data recording area DV of the hard disk drive 80.

However, the video game machine 60 accepts an input via the graphic user interface as mentioned above. Some of inputs to the video game machine 60 require the IOP 601 to access the recording area DV of the TV broadcast recorder 70 as will be described in detail later.

For example, in a follow-up replay in which a TV broadcast program content data being written to the hard disk drive 80 is reproduced with a delay of a predetermined time, for example, 20 minutes, after the recording of the TV broadcast program content data to the hard disk drive 80, the IOP 601 has to read data from an area of the data recording area DV, having the broadcast program content data recorded therein, in cooperation with the DVRP 701 in response to a command for the follow-up replay, while the DVRP 701 is writing the TV broadcast program content data to the data recording area DV of the hard disk drive 80.

On this account, the connection circuit 90 includes a bus 901 connected to the bus 600 of the video game machine 60 via a bus connection unit 608 and a bus 902 connected to the bus 700 of the TV broadcast recorder 70. It additionally includes a component provided for the DVRP 701 to access the hard disk drive 80, a component provided for the IOP 601 to access the data recording area IO in cooperation with the DVRP 701, and a component provided for the IOP 601 to request the DVRP 701 for accessing the data recording area DV.

That is, the connection circuit 90 includes a DMA (direct memory access) buffer 903 which permits to read and write data from the bus 902 under the control of the DVRP 701, a DMA buffer 904 which permits to read and write data from the bus 901 under the control of the IOP 601, a selection circuit 905, and an encryption/decryption unit 906.

Also, between the buses 901 and 902, there are provided an emulation register 907, shared register 908, shared DMA buffer 909 and an MPEG bridge 910. The emulation register 907, shared register 908 and shared DMA buffer 909 can be accessed by the IOP 601 from the bus 901, and also by the DVRP 701 from the bus 902.

The MPEG bridge 910 is controlled with a control signal from the DVRP 701 to select transfer of the compressed TV broadcast program content data from the MPEG encoder 706 to either bus 901 or 902.

Further, a modem 912 is connected to the bus 901 via a communication interface 911, for example. The modem 912 is connected to the communication (telephone) line 42.

The system formed from the DMA buffer 903, selection circuit 905 and encryption/decryption unit 906 allows the DVRP 701 to access the hard disk drive 80. Also, the system formed from the DMA buffer 904, selection circuit 905, encryption/decryption unit 906 and emulation register 907 allows the IOP 601 to access the data recording area IO in cooperation with the DVRP 701.

The selection circuit 905 is controlled with a control signal from the DVRP 701 to select connection of either the DMA buffer 903 or 904 to the hard disk drive 80.

The encryption/decryption unit 906 is provided to encrypt data for write to the hard disk drive 80 from the selection circuit 905, and decrypts data read from the hard disk drive 80.

The emulation register 907 works as an IDE (integrated device electronics) register for write of a command or control data when the IOP 601 accesses the hard disk drive 80.

For access to the hard disk drive 80, a write command or read command or control data or the like such as a data write/read rate has been written to the IDE register. Then the hard disk drive 80 write or read data according to a command or control data written in the IDE register.

As mentioned above, the IDE register is provided in the hard disk drive 80. In this embodiment, however, only the DVRP 701 can access the IDE register in the hard disk drive 80 in order to preferentially write or read a TV broadcast program content to or from the hard disk drive 80.

Therefore, in this embodiment, the IOP 601 cannot make direct access to the IDE register in the hard disk drive 80. On this account, this embodiment is so designed that to access the hard disk drive 80, the IOP 601 write a write or read command or control data or the like to the emulation register 907. Then, the command or control data written to the emulation register 907 is transferred by the DVRP 701 to the IDE register in the hard disk drive 80, to thereby result in an operation as if the IOP 601 made direct access to the hard disk drive 80.

The shared register 908 and shared DMA buffer 909 form together a component in which mainly the IOP 601 requests the DVRP 701 to access the data recording area DV. The shared register 908 allows the IOP 601 to access the data recording area DV as well as to inform the DVRP 701 of a command corresponding to a user's command supplied via the graphic-user interface and a command corresponding to a remote-control signal received from the remote commander (not shown).

[Operation Theory]

Figure 3:
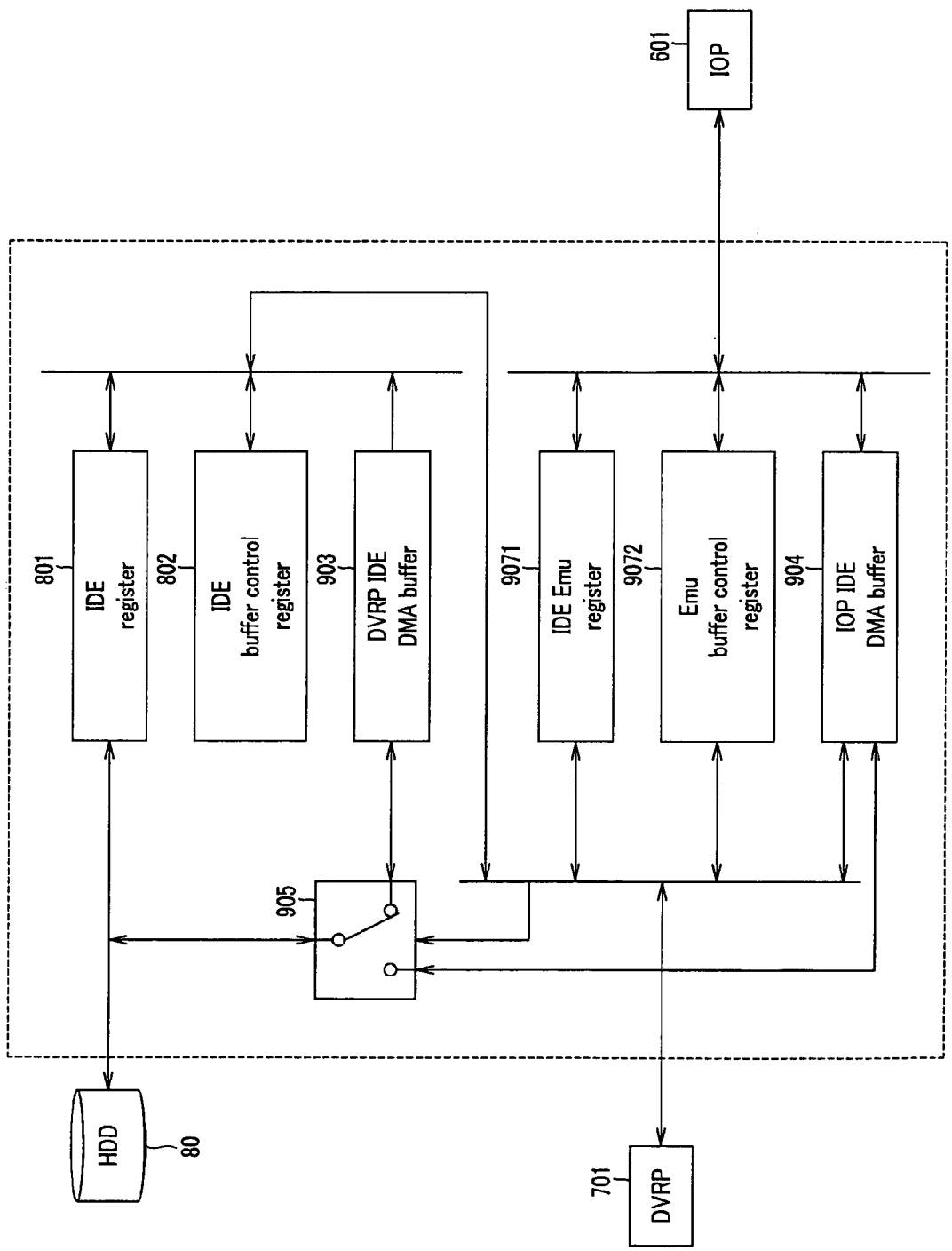
FIG. 3 explains the operation of the present invention.

FIG. 3 shows how the hard disk drive 80 is accessed. The IDE register includes a register to which there are written commands such as a write command, read comment and the like (this register is taken as the IDE register in FIG. 3) and an IDE buffer control register to which there is written control data for controlling the data write/read rate, recording area resetting and the like, which are shown separately in FIG. 3.

Although the IDE register 801 and IDE buffer control register 802 are actually provided together in the hard disk drive 80, they are shown separately from the hard disk drive 80 in FIG. 3 for the convenience of the illustration and explanation.

Also, the emulation register 907 includes an IDE emulation register 9071 and an emulation buffer control register 9072, which are shown separately from each other in FIG. 3.

The multimedia recorder/player 20 constructed as above makes its main operations as will be described below with reference to FIG. 3.

<Direct Access by DVRP 701 to Hard Disk Drive 80>

When the user operating the remote commander 50 enters, at the graphic-user interface screen, a command for data write to the hard disk drive 80 or a command for data read from the hard disk drive 80, the IOP 601 detects the command and transfers it to the DVRP 701 via the shared register 908.

The DVRP 701 thus receives the write or read command, writes it to the IDE register 801 of the hard disk drive 80, and writes address information in the data recording area DV and other necessary control data to the IDE buffer control register 802. Also, the DVRP 701 controls the selection circuit 905 to select the DMA buffer 903.

For record a TV broadcast program content, the DVRP 701 controls the selection circuit 905 to transfer coding-compressed broadcast program data content from the MPEG encoder 706 from the MPEG bridge 910 to the DMA buffer 903. Thus, the coding-compressed broadcast program data content having passed by the MPEG bridge 910 is written to the data recording area DV of the hard disk drive 80 via the DMA buffer 903, selection circuit 905 and encryption/decryption unit 906.

Also, for reading a content recorded in the hard disk drive 80, the DVRP 701 controls the selection circuit 905 to transfer coding-compressed data read from the hard disk drive 80 to the DMA buffer 903 via the encryption/decryption unit 906 and selection circuit 905. The data from the DMA buffer 903 is supplied to the video game machine 60 via the shared DMA buffer 909.

In the video game machine 60, the IOP 601 decodes the content data and supplies it to the monitor display 30 via the drawing engine 602, display image output unit 603 and image synthesizer 604.

Note here that when the write command from the IOP 601 is intended for write to a DVD, the command is sent to the DVRP 701 via the shared register 908, and the MPEG bridge 910 transfers the coding-compressed broadcast program content data to the video game machine 60 via the DMA buffer 903, RAM 702 and shared DMA buffer 909 in this order. The IOP 601 sends the supplied coding-compressed broadcast program content data to the DVD read/write head 606 via the DVD controller 607 to write the data to the DVD.

<Access by IOP 601 to Data Recording Area IO of Hard Disk Drive 80>

Next, how IOP 601 accesses the data recording area IO of the hard disk drive 80 will be described with reference to FIG. 4.

According to this embodiment, priority is given to direct access by the DVRP 701 to the hard disk drive 80, for example, to an access for write/read of a content, as having been described above. On this account, in this embodiment, the IOP 601 accesses the data recording area IO of the hard disk drive 80 while no direct access is being made by the DVRP 701 to the hard disk drive 80.

Figure 4:
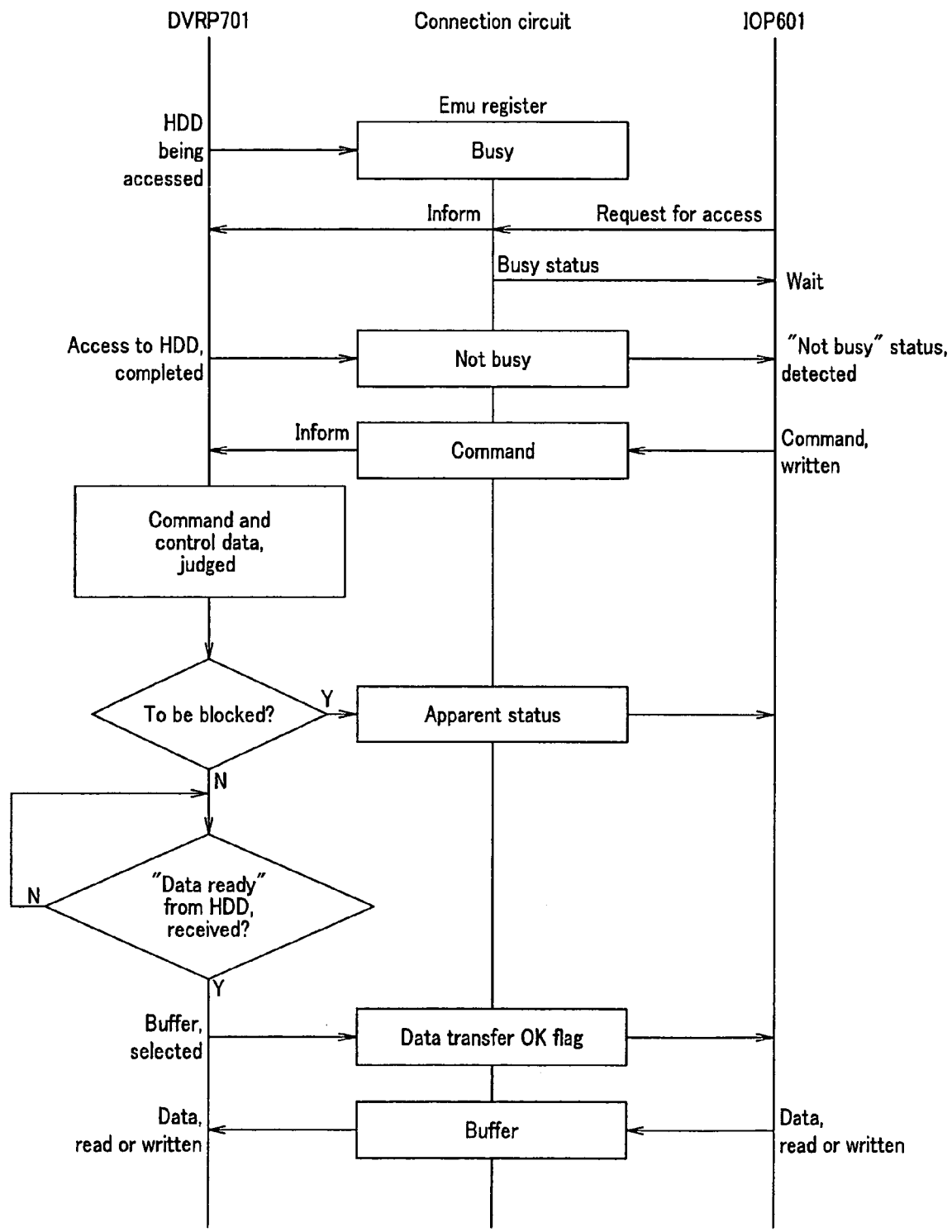
FIG. 4 explains the operation of the present invention.

Assume here that the DVRP 701 is accessing the hard disk drive 80 as shown in FIG. 4. In this case, the DVRP 701 has written, to the IDE emulation register 9071, status information "Busy" indicating that the hard disk drive 80 is busy.

When the IOP 601 issues a request for access to the hard disk drive 80, it will write the status information in the IDE emulation register 9071. When the status information "Busy" has been written in the IDE emulation register 9071, the IOP 601 will be in a standby status in which it monitors the status information in the IDE emulation register 9071 and waits until the status information indicates that the hard disk drive 80 is "available (not busy)".

On the other hand, the DVRP 701 is informed, via the IDE emulation register 9071, that the IOP 601 has issued the access request.

When the access to the hard disk drive 80 is complete, the DVRP 701 will rewrite the status information in the IDE emulation register 9071 to "Not busy". Then, the IOP 601 detects that no access is being made to the hard disk drive 80, and it will write a command to the IDE emulation register 9071 while writing control data to the IDE buffer control register 9072.

The DVRP 701 will recognize the command written in the IDE emulation register 9071 and the control data written in the IDE buffer control register 9072, and judge whether the command or control data is a predetermined one to be blocked for they will cause an inconsistency in the access to the hard disk drive 80, they will be an obstacle to an access for write or read of a content or for any other reasons. The commands and control data to be blocked include the following:

Since for write or read of a content, data should be transferred to the hard disk drive 80 at a predetermined rate, so when the control data from the IOP 601 calls for a change of the data transfer rate, it has to be blocked and no control with the control data will be done.

Also, an access by the IOP 601 to the hard disk drive 80 via the emulation register 907 is directed to the data recording area IO. So, if the data recording area DV is to be accessed, the access is improper. In this case, the DVRP 701 blocks that access against execution.

Also, when the DVRP 701 is accessing directly the hard disk drive 80, issuance of an interrupt request from the hard disk drive 80 can easily be made consistent in timing with that of an interrupt request from the DVRP 701. However, when the IOP 601 accesses the hard disk drive 80, it will issue the interrupt request quite independently of the interrupt request from the hard disk drive 80. On this account, the DVRP 701 will block the interrupt request from the IOP 601 once to make this interrupt request consistent with the interrupt request from the hard disk drive 80.

When the DVRP 701 has determined that the command or control data written to the IDE emulation register 9071 and IDE buffer control register 9072 is a one which should be blocked as above, it will write, into the IDE emulation register 9071 and IDE buffer control register 9072, status information for making the blocked command or control data out to have been accepted (will be referred to as "semblance information" hereunder) in order to prevent the IOP 601 from failing in subsequent operations, and inform the IOP 601 of the status information.

The IOP 601 having received the semblance information recognizes that operates have been done with the command or control data, and can go to a next step of operation.

Then, when the DVRP 701 has determined the command or control data written to the IDE emulation register 9071 and IDE buffer control register 9072 to be ones which have not to be blocked, it will wait until information "Data ready" indicating that data can be read or written comes from the hard disk drive 80.

Upon reception of the status information "Data ready" from the hard disk drive 80, the DVRP 701 sends a data transfer OK flag to the IOP 601 via the emulation register 907, and switches the selection circuit 905 for selection of the DMA buffer 904.

On the other hand, when there is data to be written to the hard disk drive 80, the IOP 601 having received the data transfer OK flag writes the data to the DMA buffer 904. When there is data to be read from the hard disk drive 80, the IOP 601 acquires data transferred via the DMA buffer 904. Thus, data is written to or read from the hard disk drive 80 accessed by the IOP 601.

Note that FIG. 4 shows parallel access made by the IOP 601 to the hard disk drive 80 when the hard disk drive 80 becomes available (not busy) during access by the DVRP 701 to the hard disk drive 80. Namely, when the DVRP 701 has no access to the hard disk drive 80, the latter becomes not busy (available) and thus it is of course that the IOP 601 can instantly access the hard disk drive 80 without having to wait until the latter becomes normally accessible even while the DVRP 701 has already accessed the hard disk drive 80.

<Access by IOP 601 to Data Recording Area DV of Hard Disk Drive 80>

For the so-called replay in this embodiment, the IOP 601 has to access, along with the DVRP 701, the data recording area DV of the hard disk drive 80 as having been described above.

In this case, the shared register 908 and shared DMA buffer 909 are used to allow the above-mentioned access.

Namely, with the aforementioned operation for writing a broadcast program content as direct access by the DVRP 701 to the hard disk drive 80, the DVRP 701 writes the received coding-compressed broadcast program content data sequentially to the hard disk drive 80.

In parallel with the sequential write of the broadcast program content, the coding-compressed broadcast program content data already recorded before a time earlier a designated time than the current time is read from the hard disk drive 80 in response to a follow-up replay command from the IOP 601. The content data is read as follows.

The IOP 601 sends a command for reading the hard disk drive 80 (including read-address information). The read request command is written to the shared register 908. The DVRP 701 waits until write to the hard disk drive 80 is not continuous, then reads a read request command from the shared register 908, and transfers it to the IDE register of the hard disk drive 80. Then, a designed coding-compressed broadcast program content data is read from the hard disk drive 80. The DVRP 701 transfers the read data to the shared DMA buffer 909 via the DMA buffer 903. The shared DMA buffer 909 transfers the data to the video game machine 60.

The IOP 601 of the video game machine 60 decodes the transferred coding-compressed data as in the aforementioned reproduction of data from the hard disk drive 80 and supplies the decoded data to the monitor display 30 via the image synthesizer 604 for follow-up replay of the data.

<File Management>

There has been illustrated and explained the hardware construction of the multimedia recorder/player 20 according to the embodiment of the present invention, designed to allow the two devices to access the single common hard disk drive 80. As having also been described in the foregoing, however, since the video game machine 60 has to be similar in hardware as well as software to the conventional video game machines, the video game machine 60 according to the present invention is not designed to have direct access to the hard disk drive 80.

The embodiment of the present invention solves the above problem by adopting a software configuration that will be described below.

Figure 5:
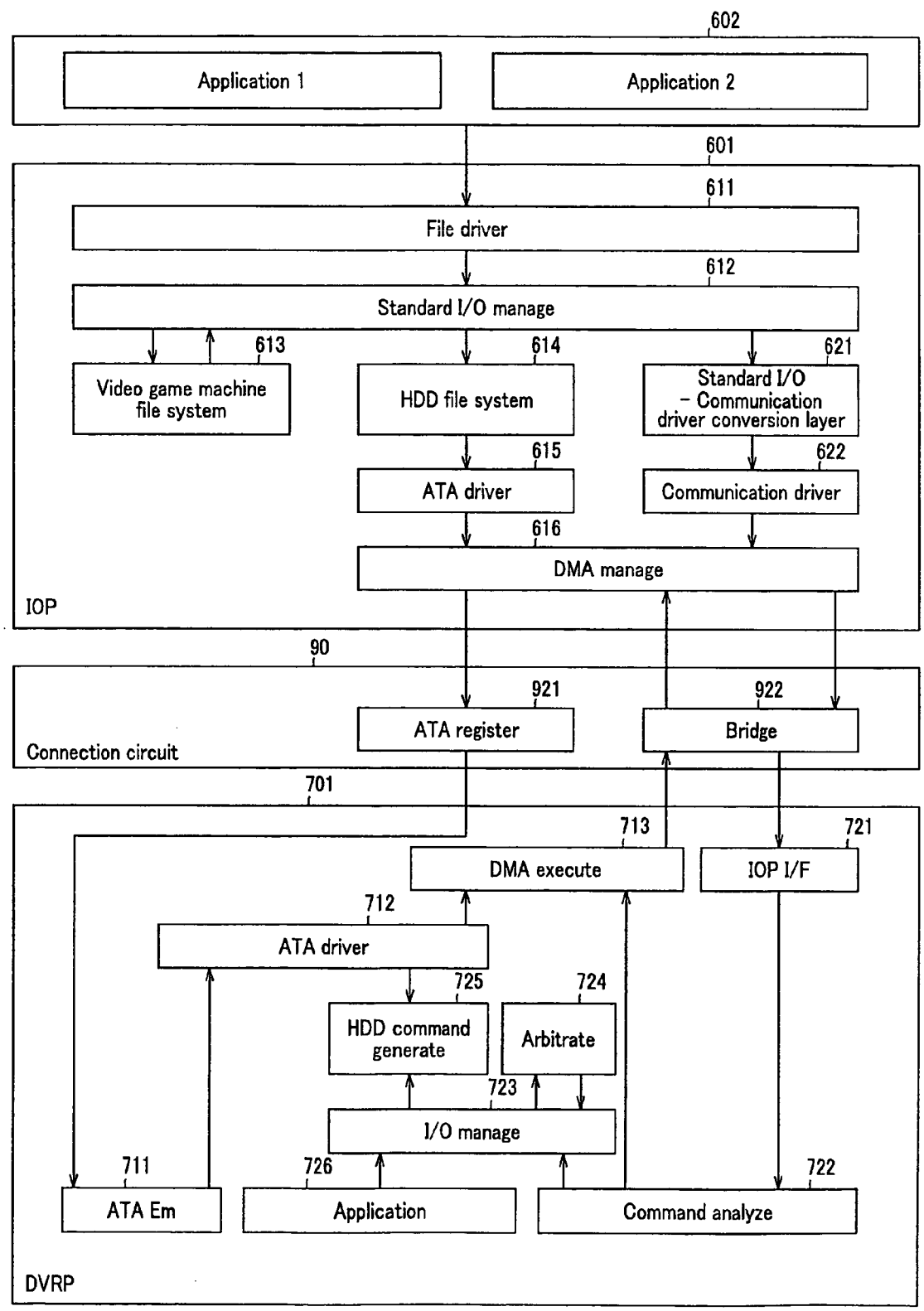
FIG. 5 explains the operation of the present invention.

FIG. 5 shows a dependency relation in software among the drawing engine 602, IOP 601, connection circuit 90 and DVRP 701. In FIG. 5, components each enclosed in a rectangular block are functional software modules. It should be noted that each arrow connecting two successive functional modules in FIG. 5 indicates a calling relation (a functional module at the arrow top is a called one), not any flow of data.

FIG. 5 shows an application 1 which is a drawing application for the video game and another application 2 which is an application for the aforementioned follow-up replay. First, the software-based operations for the drawing application 1 will be described.

When the drawing application 1 is put into run, the IOP 601 operates so that a file system 613 for the video game machine is called via a file driver 611 and standard input/output manager 612. Since no command to the hard disk drive 80 can be called with only the video game machine file system, a file system 614 for the hard disk drive 80 is called to convert data into a form by which it is possible to call a command to the hard disk drive 80.

Then, an ATA driver 615 is called to have direct access to an ATA command, and the command and data are stored into an ATA register 921 in the connection circuit 90 via a DMA manager 616. The ATA register 921 includes the aforementioned emulation register 907.

Then, an ATA emulator 711 in the DVRP 701 receives the data and command from the ATA register 921, and when it recognizes that it is necessary to issue an ATA command, it starts up an ATA driver 712 to access the hard disk drive 80. Data written to or data read from the hard disk drive 80 owing to the access by the ATA drive 712 is DMA-transferred by the DMA execution unit 713 as having previously been described. The DMA-transferred data is managed by the DMA manager 616 in the IOP 601 via a bridge 922 in the connection circuit 90, and thus the video game drawing will reflect the data from the hard disk 80.

In the foregoing, there has been illustrated and explained the access by the IOP 601 to the hard disk drive 80 with intervention of the DVRP 701 in that access.

Next, when the follow-up replay application 2 is put into run, the IOP 601 operates so that the standard input/output manager 612 is called via the file driver 611 and managed as a file by the video game machine file system 613. Then, a standard input/output-communication driver conversion layer 621 is called. The standard input/output-communication driver conversion layer 621 converts a file in the IOP 601 into data and command in such a form that they can pass by the connection circuit 90.

Next to the standard input/output-communication driver conversion layer 621, the DMA manager 616 is called via a communication driver 622 which sends data and command to the DVRP 701 via the connection circuit 90, and DMA-transferred from the IOP 601 to the DVRP 701 via the bridge 922. The bridge 922 includes the shared register 908 and shared DMA buffer 909.

The DVRP 701 receives the data DMA-transferred from the IOP 601 via an IOP interface 721. Then a command analyzer 722 in the DVRP 701 analyzes a command received via the IOP interface 721. Depending upon the result of the command analysis, an input/output manager 723 similar to the standard input/output manager 612 in the IOP 601 calls an arbitrator 724 and also a command generator 725 for the hard disk drive 80. The input/output manager 723 has supplied thereto an application at the DVRP 701, for example, an broadcast program recording application.

The arbitrator 724 arbitrates between a command at the DVRP 701 and a command at the IOP 601 to decide which command is to be executed. For example, in case a write has command come from one of the DVRP 701 and IOP 601 while a read command has come from the other, the arbitrator 724 arbitrates between the commands against inconsistency between them.

The hard disk drive command generator 725 starts up the ATA driver 712 to carry out the command to the hard disk drive 80.

In the foregoing, the access using the aforementioned shared register 908 and shared DMA buffer 909 has been described. Next, a file management using the shared register 908 and shared DMA buffer 909 will be described with reference to FIG. 6.

Figure 6:
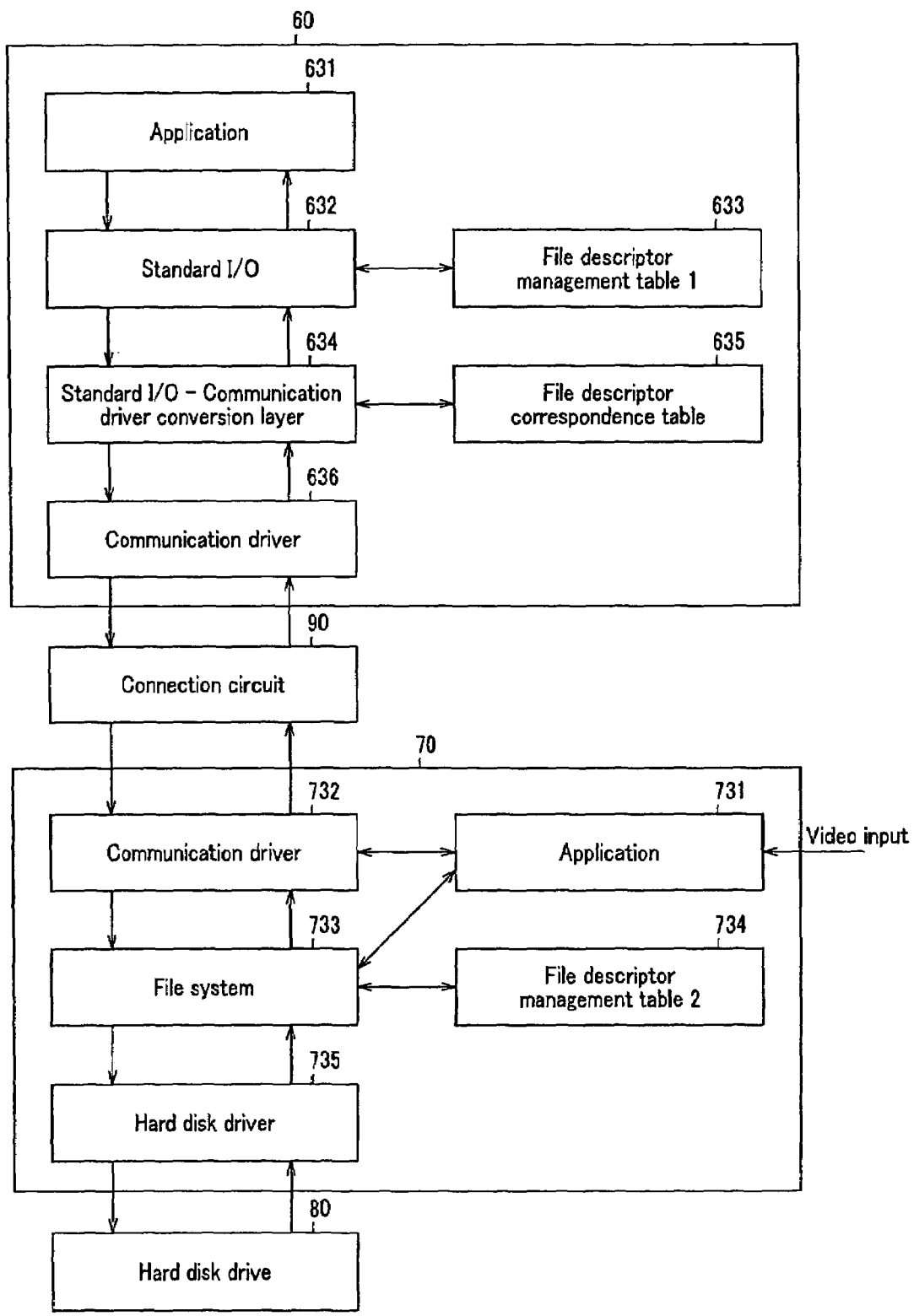
FIG. 6 explains the operation of the present invention.

According to this embodiment, the file management system includes an information processor including the video game machine 60 (which is indicated with a reference 60 in FIG. 6) and a recorder including the TV broadcast recorder 70 (which is indicated with a reference 70 in FIG. 6). As shown, the information processor 60 and recorder 70 includes applications 631 and 731, respectively, which are independent of each other. As having been described above, the application 631 in the information processor 60 can request the application in the recorder 70 to make a recording program, video data acquisition, etc. On the other hand, the application 731 in the recorder 70 execute the recording program made by the application 631 in the information processor 60. Thus, even when the information processor 60 is not turned on, the recording program can be executed.

According to this embodiment, the file system in the recorder 70 can be used in common by the application 631 in the information processor 60 and application 731 in the recorder 70 as having been described above. Arbitration is made between these two applications 631 and 731 by a file system 733 in the recorder 70.

However, since the information processor 60 and recorder 70 shares no memory for the file management, there is a problem in handling a file descriptor (file key number).

Normally, a standard input/output unit 632 is provided to issue a file descriptor, and a file descriptor management table 633 is provided to manage the file descriptor. However, since the file system 733 is provided in the recorder 70, a file descriptor is required for the recorder 70 as well. The file descriptor in the recorder 70 is managed by a file descriptor management table 734. Thus, there are two file descriptors, which is a problem.

To solve this problem, it may be one of possible approaches to modify the specification of the standard input/output unit and so that the file system 733 of the recorder 70 issues a file descriptor without having the standard input/output unit 632 issue any file descriptor only when according the file system in the recorder 70. In case the information processor is formed from the video game machine whose versatility is an very important factor as in this embodiment, however, it is not desirable to add such a special function to the standard input/output unit 632 and such an additional function will be inconvenient in the respect of maintenance. Further, the additional function will be an unnecessary one in future.

On this account, file descriptors issued by the information processor 60 and recorder 70, respectively, are managed by the file descriptor managers 633 and 734, respectively, and a correspondence relation between these file descriptors is stored in a file descriptor correspondence table in the information processor 60, according to this embodiment.

The file descriptor in the information processor 60 and that in the recorder 70 are interchanged with each other in a standard input/output-communication driver conversion layer 634. Thus, the application 631 in the information processor 60 can use the file system in the recorder 70 without taking account of any difference from the file descriptor in the recorder 70.

In the foregoing, the present invention has been described in detail concerning a certain preferred embodiment thereof as an example with reference to the accompanying drawings. However, it should be understood by those ordinarily skilled in the art that the present invention is not limited to the embodiment but can be modified in various manners, constructed alternatively or embodied in various other forms without departing from the scope and spirit thereof as set forth and defined in the appended claims.

For example, although the embodiment is arranged to record a TV broadcast program content received by the TV broadcast receiver to the hard disk drive 80, the TV broadcast recorder 70 may be provided with an external input terminal to record image data supplied via the external input terminal to the hard disk drive 80.

Also, although the aforementioned embodiment is an application of the present invention to a multisystem network including a combination of the video game machine and TV broadcast recorder, it is of course that devices to be thus combined are neither limited to the video game machine and TV broadcast recorder nor to the information recorder and recorder.

Further, the data storage unit is not limited to a hard disk drive but may be an optical disk drive or semiconductor memory.

What is claimed is:

1. A multisystem network comprising:
    a first device with a first processor and a first file descriptor management table;
    a second device with a second processor, a second file descriptor management table and a file descriptor correspondence table;
    a data storage unit having a first data storage area for the first device and a second data storage area for the second device; and
    a connection circuit connected between the first and second devices and the data storage unit,
    the connection circuit having provided therein an emulation register equivalent to a register for storage of a command or control data used for access to the data storage unit by the first processor;
    data transfer between the first device and data storage unit being made by the first processor directly accessing the data storage unit via the connection circuit; and
    data transfer between the second device and data storage unit being made by the second processor accessing the emulation register and by the first processor accessing the data storage unit correspondingly to the content of the emulation register,
    wherein the first file descriptor management table is a file system to manage data read from or written to the data storage unit,
    wherein file descriptors issued by the first and second devices are managed by the first and second file descriptor management tables respectively, a correspondence relationship between the file descriptors is stored in the file descriptor correspondence table.

2. The multisystem network according to claim 1, wherein, when the first processor is transferring between the first device and data storage unit, it sends status information indicating that the data storage unit is busy to the second processor in the second device via the emulation register in order to keep the second processor from accessing the data storage unit.

3. The multisystem network according to claim 1, wherein the first processor recognizes a command or control data the second processor of the second device has written to the emulation register, and will not make any control over data access, based on the recognized command or control data, to the data storage unit when the recognized command or control data is a predetermined one.

4. The multisystem network according to claim 3, wherein, when the first processor does not make any control over access, based on the command or control data, to the data storage unit, it sends, to the second processor via the emulation register, status information apparently indicating that it has made a control over data access, based on the command or control data, to the data storage unit.

5. The multisystem network according to claim 1, wherein the second processor converts a command or control data issued by itself into a one complying to an interface standard applied to the data storage unit, and writes it into the emulation register.

6. The multisystem network according to claim 1, wherein for the second processor to make data access to the first area, the connection circuit has a shared register and shared buffer provided therein to store a command or control data for use to access the data storage unit and which can be accessed in common by the first and second processors.

7. The multisystem network according to claim 6, wherein:
    when data is read from or written to the first area by the second processor, the data is read from or written to the shared buffer as data for the file system managed by the first processor.

8. The multisystem network according to claim 1, wherein:
    the first device is an information recording circuit; and
    the second device is an information processing circuit.

9. The multisystem network according to claim 8, wherein:
    the information recording circuit as the first device is a TV broadcast recorder; and
    the information processing circuit as the second device is a video game machine.

10. The multisystem network according to claim 1, wherein the data storage unit is a hard disk drive.

11. A device for access to a data storage unit, comprising:
    a data storage unit having a data storage area including first and second areas different from each other;
    a first processor capable of direct access to the data storage unit, the first processor including a first file descriptor management table;
    a first buffer that is controlled by the first processor to read data from or write data to the first area of the data storage unit and holds the data;
    a register that stores a command or control data used for the first processor to access the data storage unit and an emulation register corresponding to the register;
    a second processor capable of access to the data storage unit via the emulation register and with intervention of the first processor, the second processor including a second file descriptor management table and a file descriptor correspondence table;
    a second buffer that is controlled by the second processor to read data from or write data to the second area of the data storage unit and holds the data; and
    a selecting means that is controlled by the first processor to select data from either the first or second buffer as data to be read from or written to the data storage unit,
    wherein the first file descriptor management table is a file system to manage data read from or written to the data storage unit,
    wherein file descriptors issued by the first and second devices are managed by the first and second file descriptor management tables respectively, a correspondence relationship between the file descriptors is stored in the file descriptor correspondence table.

12. The device according to claim 11, wherein, when the first processor is reading data from or writing data to the first area of the data storage unit via the first buffer, it sends status information indicating that the data storage unit is busy to the second processor via the emulation register in order to keep the second processor from accessing the data storage unit.

13. The device according to claim 11, wherein the first processor recognizes a command or control data the second processor of the second device has written to the emulation register, and will not make any control over data access, based on the recognized command or control data, to the data storage unit when the recognized command or control data is a predetermined one.

14. The device according to claim 13, wherein, when the first processor does not make any control over access, based on the command or control data, to the data storage unit, it sends, to the second processor via the emulation register, status information apparently indicating that it has made a control over data access, based on the command or control data, to the data storage unit.

15. The device according to claim 11, wherein the second processor converts a command or control data issued by itself into a one complying to an interface standard applied to the data storage unit, and writes it into the emulation register.

16. The device according to claim 11, wherein for the second processor to make data access to the first area, there are provided a shared register intended to store a command or control data for use to access the data storage unit and which can be accessed in common by the first and second processors, and a data-transfer third buffer.

17. The device according to claim 16, wherein:
when data is read from or written to the first area by the second processor, the data is read from or written to the third buffer as data for the file system managed by the first processor.

18. The device according to claim 11, wherein the data storage unit is a hard disk drive.

19. A method for accessing a data storage unit by a first device including a first processor and a second device including a second processor, the first processor including a first file descriptor management table and the second processor including a second file descriptor management table and a file descriptor correspondence table, comprising the steps of:
dividing a data storage area of the data storage unit into a first area used for the first device and a second area used for the second device;
providing an emulation register corresponding to a register which gives priority to data read and write, by the first processor, from and to the first area of the data storage unit and stores a command or control data used for access by the first processor to the data storage unit;
providing data transfer between the first device and data storage unit through direct access by the first processor to the data storage unit via the connection circuit; and
providing data transfer between the second device and data storage unit through access by the second processor to the emulation register and access, corresponding to the content of the emulation register, by the first processor to the data storage unit,
wherein the first file descriptor management table is a file system to manage data read from or written to the data storage unit,
wherein file descriptors issued by the first and second devices are managed by the first and second file descriptor management tables respectively, a correspondence relationship between the file descriptors is stored in the file descriptor correspondence table.

20. The method according to claim 19, wherein:
when the first processor is transferring data between the first device and data storage unit, it sends status information indicating that the data storage unit is busy to the second processor in the second device via the emulation register in order to keep the second processor from accessing the data storage unit; and
when the data read or write between the data storage unit and first device is complete, the first processor informs the second processor that the latter can access the data storage unit via the emulation register.

21. The method according to claim 19, wherein the first processor recognizes a command or control data the second processor of the second device has written to the emulation register, and will not make any control over data access, based on the recognized command or control data, to the data storage unit when the recognized command or control data is a predetermined one.

22. The method according to claim 21, wherein, when the first processor does not make any control over access, based on the command or control data, to the data storage unit, it sends, to the second processor via the emulation register, status information apparently indicating that it has made a control over data access, based on the command or control data, to the data storage unit.

23. The method according to claim 19, wherein the second processor converts a command or control data issued by itself into a one complying to an interface standard applied to the data storage unit, and writes it into the emulation register.

24. The method according to claim 19, wherein for the second processor to make data access to the first area, the connection circuit has a shared register and shared buffer provided therein to store a command or control data for use to access the data storage unit and which can be accessed in common by the first and second processors.

25. The method according to claim 24, wherein:
when data is read from or written to the first area by the second processor, the data is read from or written to the shared buffer as data for the file system managed by the first processor.

26. A device for access to a data storage unit, comprising:
a data storage unit having a data storage area including first and second areas different from each other;
a first processor capable of direct access to the data storage unit, the first processor including a first file descriptor management table;
a first buffer that is controlled by the first processor to read data from or write data to the first area of the data storage unit and holds the data;
a register that stores a command or control data used for the first processor to access the data storage unit and an emulation register corresponding to the register;
a second processor capable of access to the data storage unit via the emulation register and with intervention of the first processor, the second processor including a second file descriptor management table and a file descriptor correspondence table;
a second buffer that is controlled by the second processor to read data from or write data to the second area of the data storage unit and holds the data; and
a selector that is controlled by the first processor to select data from either the first or second buffer as data to be read from or written to the data storage unit,
wherein the first file descriptor management table is a file system to manage data read from or written to the data storage unit,
wherein file descriptors issued by the first and second devices are managed by the first and second file descriptor management tables respectively, a correspondence relationship between the file descriptors is stored in the file descriptor correspondence table.

* * * * *